Aug. 22, 1944.  B. VON BORRIES ET AL  2,356,551
ELECTRONIC MICROSCOPE
Filed Aug. 29, 1941
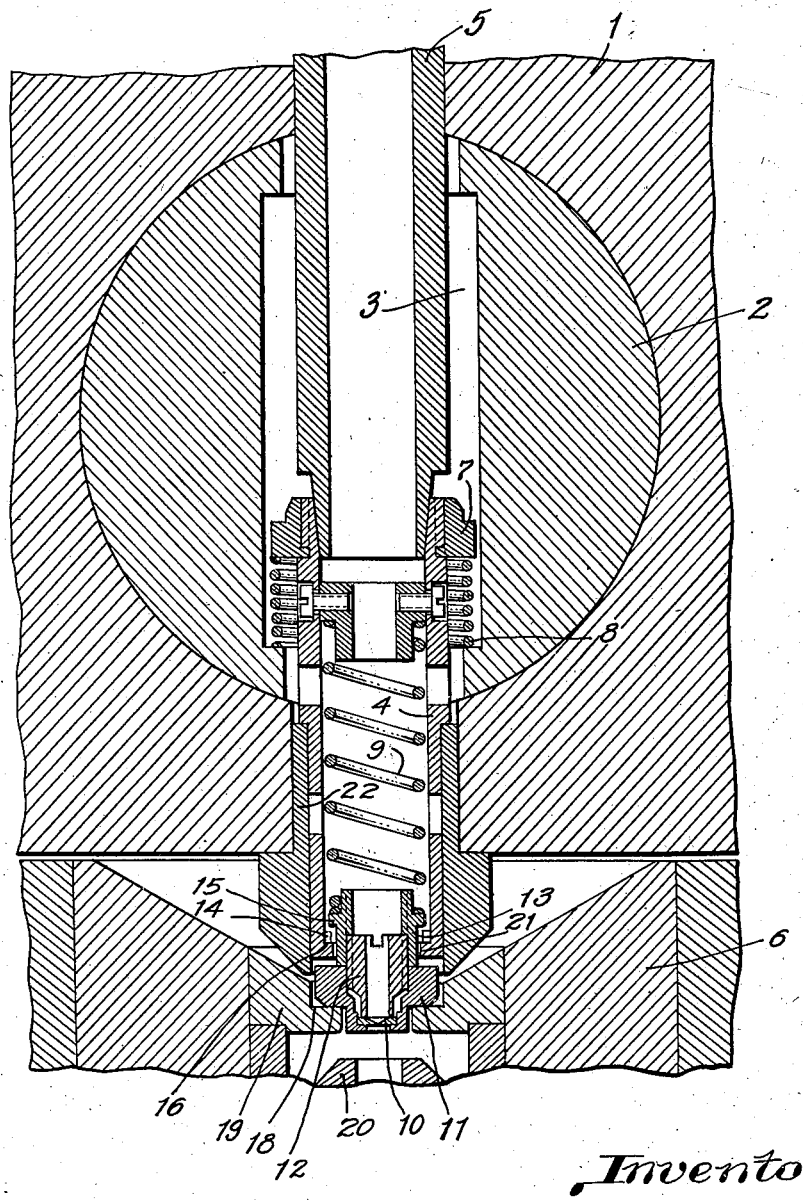
Inventors
Bodo von Borries
Heintz Otto Müller
Ernst Ruska
By Auttolombe
Attorney.

Patented Aug. 22, 1944

2,356,551

UNITED STATES PATENT OFFICE 2,356,551

ELECTRONIC MICROSCOPE

Bodo von Borries, Heinz Otto Müller, and Ernst Ruska, Berlin-Spandau, Germany; vested in the Alien Property Custodian Application August 29, 1941, Serial No. 408,830
In Germany July 22, 1940

4 Claims. (Cl. 250—49.5)

This invention relates to improvements in electronic microscopes.

The electronic microscopes hitherto employed present the disadvantage in that they are relatively sensitive to vibrations. If when taking pictures of the object slight vibrations of the microscope occur, the latter cause unsteady pictures. As tests have shown, these faults are brought about by the fact that in the known electronic microscope slight oscillations may occur between the object and the objective. In the case of magnifications of $10^{-4}$ to $10^{-5}$, amplitudes of $10^{-5}$ to $10^{-6}$ exert a disturbing effect. This sensitiveness to vibrations is present to a slight extent in such electronic microscopes in which the object carrier is firmly secured to the structure of the objective lens.

The object of the present invention is to also render such constructions of electronic microscopes insensitive to vibrations in which the object carrier is independent of the objective so that it is not necessary to remove the objective lens from the microscope when replacing the object. This is accomplished according to the invention by providing spring means for pressing the objective carrier against the stationary part of the objective lens so that relative movements between the object and the objective lens are prevented. In the known electronic microscopes which employ an object cartridge for sluicing the object into the vacuum chamber, the invention may be carried into practice by providing guide means in which the object carrier is so supported as to be axially displaceable within the cartridge against the compressive force of a spring. The arrangement is, for instance, so designed that the object carrier projects from the cartridge at the side facing the objective lens and is pressed in the operating position with a contact surface abutting against a corresponding surface of the objective.

In the accompanying drawing is shown an embodiment of the invention in diagrammatic form. The drawing represents a longitudinal sectional view of the part of an electronic microscope arranged above the objective lens. 1 denotes the stationary vacuum chamber wall of the microscope. A sluicing device 2, designed in the form of a cock plug, serves to sluice the object into the vacuum chamber 3. 4 denotes the object cartridge in the operating position in which the cartridge is pressed out of the sluicing chamber 3 with the aid of a driving rod 5 in the direction towards the structure 6 of the objective lens. The upper holding ring 7 of the cartridge is under pressure by a spring 8 which returns the cartridge into the sluicing chamber 3 when the rod 5 moves in the upward direction. The object carrier film is applied in the known manner to an object diaphragm 10. This diaphragm is arranged in a holder 11 and clamped with the aid of a screw 12. The screw 12 projects from the holder 11 and is screwed into a guide part 13 which is under the action of a spring 9. As indicated at 14, lugs which fit in corresponding slots 15 are provided inside the cartridge. These slots are arranged in the guide part 13. In the relieved state, the spring 9 presses the guide part 13 in the downward direction until it comes into engagement with the stop 16. The slots 15 and the lugs 14 prevent the guide part 13 from being rotated when screwing on the screw 12. In the operating position shown, the contact surface 17 of the holder 11 is in engagement with a corresponding surface 18 of the upper pole shoe 19 of the electromagnetic objective lens. 20 denotes the second pole shoe of the lens. Between the parts 13 and 4 there is a slight clearance as indicated at 21. 22 is a guide body into which the cartridge is pressed in the operating position. Vibrations which may produce oscillations between the objective lens and the cock plug 2 are no longer the cause of faulty images in this arrangement, since the objective holder, in the operating position shown, is firmly pressed against the upper pole shoe 19 by the spring 9. Consequently, relative movements between the object carrier and the objective are no longer possible. The invention may also be applied to ion microscopes.

What is claimed is:

1. An electron microscope having a vacuum vessel, a stationary objective lens structure disposed in said vessel, object holding means detachable from said vessel and said lens structure, a sluicing device for inserting said object holding means into said vessel and in which device said holding means are movably supported, said lens structure having a pole shoe facing said sluicing device, said pole shoe and said object holding means having opposite contact surfaces respectively, means for moving said holding means from said sluicing device towards said pole shoe so as to cause said contact surfaces to firmly engage each other.

2. An electron microscope having a vacuum vessel, an objective lens structure in said vessel, an object holder detachable from said vessel and lens structure, a sluicing device for inserting said holder into said vessel, said sluicing device having guiding means provided therein for mounting the holder for movement along to the electron-optical axis of said lens structure, said holder and said lens structure having opposite contact surfaces respectively, actuating means for moving said holder in said guiding means towards and away from said lens structure respectively, and a spring arranged between said actuating means and said holder so as to hold said contact surfaces in bearing with each other when said holder is moved towards said lens structure.

3. An electron microscope having a vacuum vessel, an objective lens structure in said vessel, an object cartridge detachable from said vessel and lens structure, a sluicing device for inserting said cartridge into said vessel, said device having guiding means for permitting said cartridge a movement in the axial direction towards and away from said lens structure, an object holder proper attached to said cartridge with a clearance between said two parts to permit a limited axial motion between them, a spring disposed in said cartridge in engagement with said holder to move the latter towards said lens structure when said cartridge is in operating position, actuating means for moving said cartridge from said sluicing device towards said lens structure, said lens structure having a stop surface for limiting the movement of said holder, whereby said holder is resiliently held against said stop surface by said spring when said cartridge is in the operating position.

4. An electron microscope having a vacuum vessel, a stationary objective lens structure disposed in said vessel, a sluicing device insertable in said vessel, said sluicing device provided with a conduit which extends therethru and which is aligned with the electron optical axis of the microscope when the sluicing device is in operative position, object holding means slidable in said conduit, said lens structure having a pole shoe, a surface on said holding means and a surface on said pole shoe being brought into bearing with each other when the holding means are in operative position, actuating means for moving said holding means towards and away from said lens structure, and a spring arranged within said holding means for holding said surfaces in bearing contact with each other when said holder is moved towards said lens structure.

BODO von BORRIES.
HEINZ OTTO MÜLLER.
ERNST RUSKA.